United States Patent
Weimer et al.

(10) Patent No.: US 6,601,791 B2
(45) Date of Patent: Aug. 5, 2003

(54) TRAILING CABLE WINCH AND METHOD OF OPERATION

(75) Inventors: Peter Weimer, Markdorf (DE); Ulf Thümer, Hainichen (DE)

(73) Assignee: Dornier GmbH, Friedrichshafen (DE)

( * ) Notice: Subject to any disclaimer, the term of this patent is extended or adjusted under 35 U.S.C. 154(b) by 0 days.

(21) Appl. No.: 09/828,482

(22) Filed: Apr. 9, 2001

(65) Prior Publication Data

US 2002/0003183 A1 Jan. 10, 2002

(30) Foreign Application Priority Data

Apr. 8, 2000 (DE) .......................... 100 17 599

(51) Int. Cl.[7] .............................................. B65H 75/38
(52) U.S. Cl. ...................................................... 242/386
(58) Field of Search ................. 242/386, 234, 242/472.6

(56) References Cited

U.S. PATENT DOCUMENTS 2,919,869 A   1/1960  Hopper et al. ................. 244/3
4,953,803 A * 9/1990  LeCompte .................. 242/386
5,257,746 A   11/1993 Norrvi et al.

FOREIGN PATENT DOCUMENTS

DE    198 12 335    10/1999

\* cited by examiner

*Primary Examiner*—John Q. Nguyen
(74) *Attorney, Agent, or Firm*—Crowell & Moring LLP

(57) ABSTRACT

Trailing cable winch and method of operation in which an axially stationary, rotating winding arm is disposed in a carrier tube and driven by a motor arranged in the carrier tube. The trailing cable winch is operable to deposit a trailing cable on an axially reversibly movable cable drum which is disposed on the carrier tube. The rotation of the winding arm is synchronized with the advancing of the cable drum, so that, during a linear movement of the cable drum, the advance per rotation of the winding arm corresponds exactly to the diameter of the trailing cable. In the end position of the cable drum, two cable layers are deposited above one another.

11 Claims, 3 Drawing Sheets

TRAILING CABLE WINCH AND METHOD OF OPERATION

BACKGROUND AND SUMMARY OF THE INVENTION

This application claims the priority of German Application No. 100 17 599.6-22, filed in Germany on Apr. 8, 2000, the disclosure of which is expressly incorporated by reference herein.

The invention relates to a trailing cable winch having an axially stationary, rotating winding arm which is disposed in a carrier tube and is driven by a motor arranged in the carrier tube. The trailing cable winch operates to deposit the trailing cable on an axially reversibly movable cable drum which is disposed on the carrier tube, in which case the rotation of the winding arm is synchronized with the advancing of the cable drum. As a result, during the linear movement of the cable drum, the advance per rotation of the winding arm corresponds exactly to the diameter of the trailing cable, and in the end position of the cable drum, exactly two cable layers are deposited above one another.

A trailing cable winch of this type is known from German Patent Document DE 198 12 335 C1.

U.S. Pat. No. 2,919,869 discloses a trailing cable winch which has a planet wheel transmission. The planet wheel transmission drives a cable drum which is axially displaceable arranged on a rotatable frame. In addition, the planet wheel transmission drives a shaft which is coaxially arranged with respect to the rotatable frame, this shaft having an endless vertically constructed groove. In this groove, a driving device is guided which is connected with the cable drum and therefore permits a displacement of the cable drum.

It is an object of the present invention to provide an active trailing cable winch for towed decoy bodies on combat airplanes which has the following characteristics:
a) smallest possible constructional size, while the winding volume is maximal and the mass is minimal;
b) derived from requirement a), a drive/transmission unit which, if possible, is integrated;
c) a depositing of the cable windings, which is as exact as possible, during the wind-up (exactly reproducible);
d) slow-speed run at a high torque as well as maximal wind-off and wind-up speeds;
e) minimizing of friction losses;
f) for high-voltage conductors and optical waveguides, a construction without rotating joints (requires a standing cable drum with a rotating winding arm); and
g) no bending radii smaller than 6 mm are permissible (leads to the breakage of the optical waveguide).

According to the invention, this object is achieved by providing a trailing cable winch in which a rotation of the winding arm is synchronized with the axial movement of the cable drum such that the cable drum advances an axial distance per rotation of the winding arm which corresponds substantially to a diameter of the trailing cable such that two cable layers are deposited above one another between end positions of the cable drum. The object of the invention meets the requirement that, per winding arm rotation, an exact drum advance of a trailing cable thickness takes place to the drum end; then almost no advance takes place for one rotation, so that, in the next higher position of the drum, the first winding comes to be situated as directly as possible on the drum flank. Subsequently, the winding operation is to be continued at a constant advance in the reverse direction. As a result, the accumulation of cable windings in the center area of a drum, which can often be observed, is avoided and the size is therefore minimized while the operational reliability is optimized.

The object of the invention has the following advantages:
a) optimizing of the trailing cable winch with respect to the space requirement and maintaining installation space limits;
b) flexibility of the drive with respect to its ability of adapting an output torque by easily exchangeable step-down stages;
c) optimizing of the winding design at the deflection points (lateral disks of the cable drum);
d) rotational rotor speed 0 to 2,000 min$^{-1}$ (corresponding to an axial cable winding speed of 0 to 14 m/sec);
e) avoidance of a return movement of the drive which is caused by the load on the trailing cable. For this purpose, when the driving motor is not activated, the trailing cable winch 2 is automatically locked by means of a locking brake 36 (FIG. 1) which causes the no-back securing; and
f) supporting and transmission of a torque caused by the trailing load.

Other objects, advantages and novel features of the present invention will become apparent from the following detailed description of the invention when considered in conjunction with the accompanying drawings.

DETAILED DESCRIPTION OF THE DRAWINGS

Figure 1:
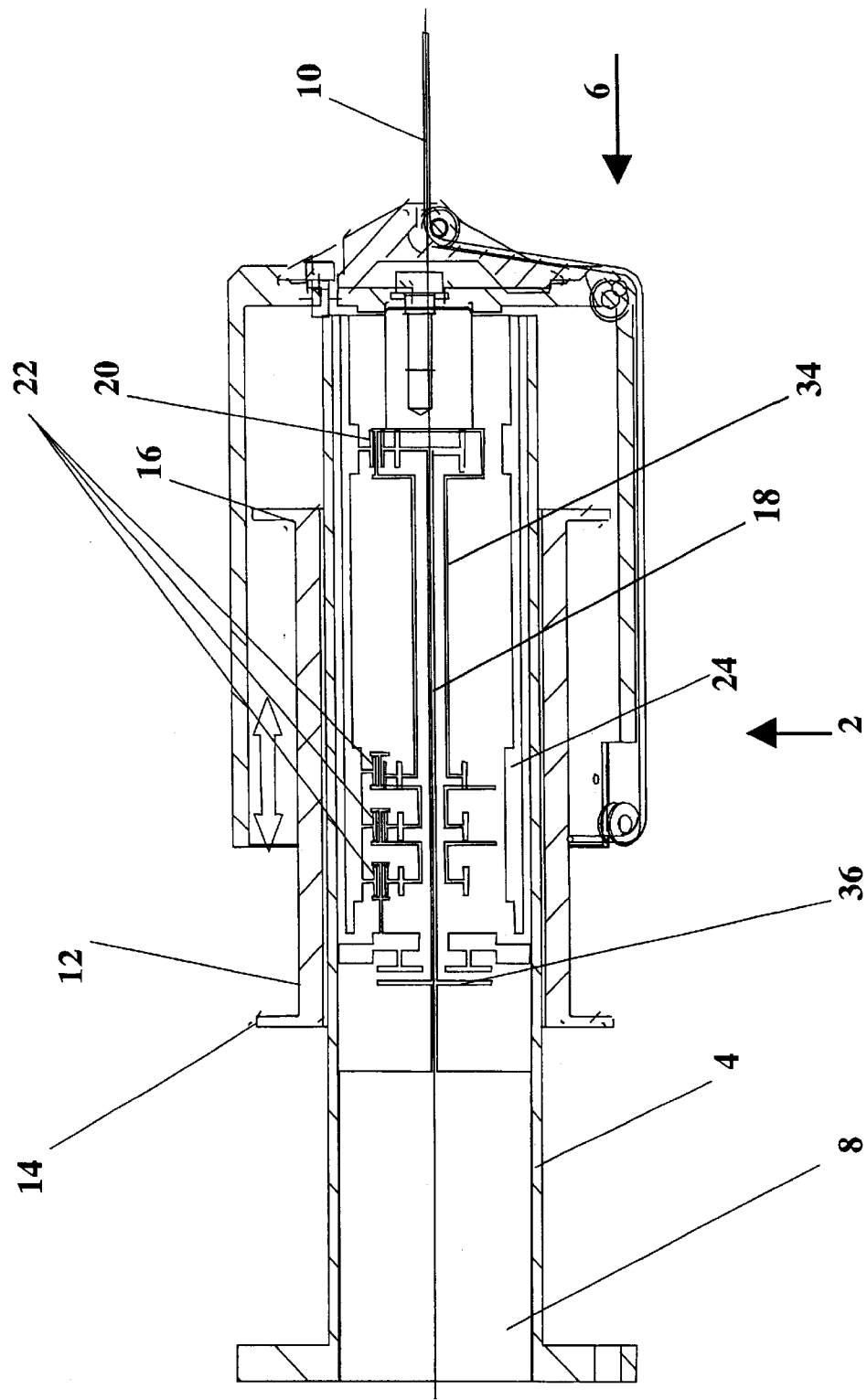
FIG. 1 is a sectional view of a trailing cable winch according to the invention.
Figure 2:
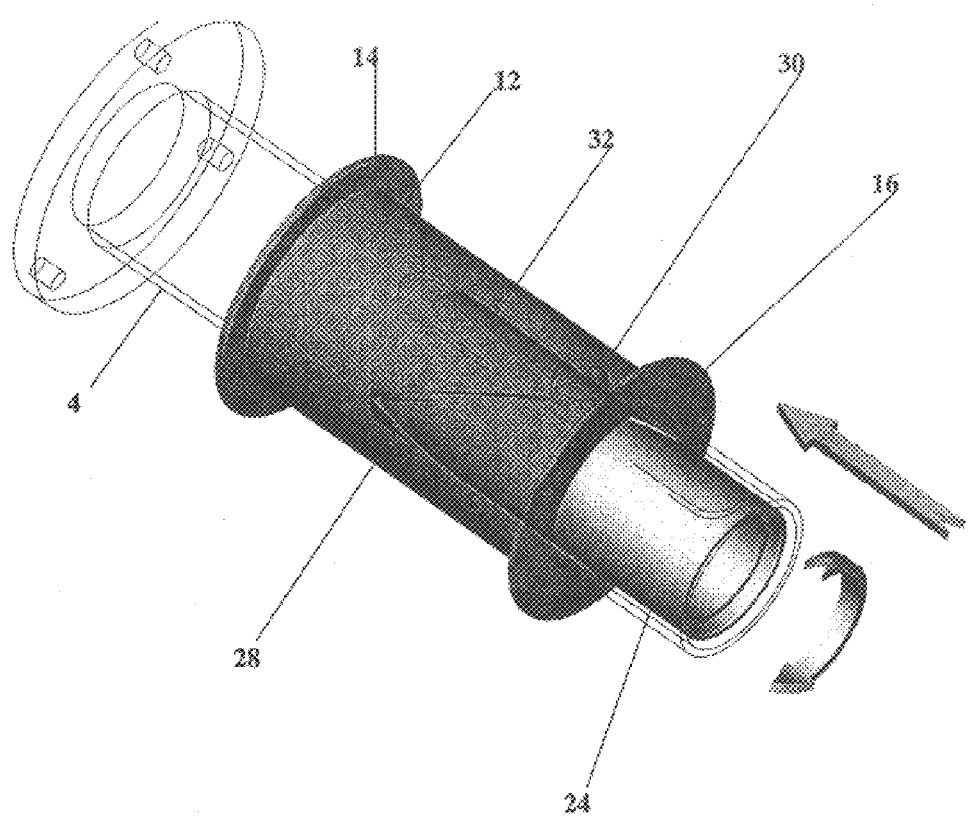
FIG. 2 is an axonometric representation of the cable drum and of the transmission-related design for its reversing movement.

FIG. 1 illustrates a trailing cable winch 2 having an axially stationary, rotating winding arm 6 which is disposed on a carrier tube 4 and is driven by a motor 8 arranged in the carrier tube 4. The trailing cable winch 2 deposits a trailing cable 10 on an axially reversibly movable cable drum 12 which is disposed on the carrier tube 4. The rotation of the winding arm 6 is synchronized with the advancing of the cable drum 12, so that, during the linear movement of the cable drum 12, its respective advance per rotation of the winding arm 6 corresponds exactly to a diameter of the trailing cable 10. In the end position of the cable drum 12, on its lateral disks 14, exactly two cable layers are consistently deposited above one another. In the carrier tube 4, a multistage planet wheel transmission 20, 22 which is driven by the motor shaft 18 is disposed whose secondary stage 22 drives a hollow cylinder 24 situated in the carrier tube 4. The cylinder jacket 26 has a guide groove 28 (FIGS. 2, 3, 4) which is closed in itself. A guiding pin 30, which is connected with the cable drum 12, engages the guide groove 28 and, when the hollow cylinder 24 is rotated, causes the advancing of the cable drum 12. The guiding pin 30 is guided then in an axial oblong hole 32 in the carrier tube 4.

In addition, FIG. 1 shows that the primary stage 20 of the multistage planet wheel transmission causes the stepping-down of the rotating winding arm 6 and the secondary stage 22 of the planet wheel transmission causes the stepping-down of the hollow cylinder 24 with the guide groove 28. The primary stage 20 is connected with the secondary stage 22 by means of a hollow shaft 34.

The primary stage 20 of the multi-stage planet wheel transmission may be exchangeable for a primary stage with another reduction. This is not illustrated in the figures.

The embodiment illustrated in FIG. 1 is based on the known principle of an axially stationary, rotating winding arm (rotor) 6 and of a purely axially movable spool or cable drum 12. The present invention permits the individual cable windings to be cleanly placed against one another, with a defined and rotational-rotor-speed-dependent drum advance, as well as a free design possibility of the cable guidance at the reversal points (lateral disks 14, 16) of the drum 12 for the optimal layer change by the forced guidance of the cable drum 12 by way of a guiding pin 30 in a guiding groove 28 (curve, spline) and a systematic mutual connection of planet wheel transmissions 20, 22 in the interior of the hollow cylinder 24. In the case of this transmission arrangement, it is possible to exchange the primary stage 20 (for the rotor reduction) at low expenditures for a stage with a different reduction, in which case the transmission linkage of the rotor 6 to the cable drum 12 is not affected.

Figure 4:
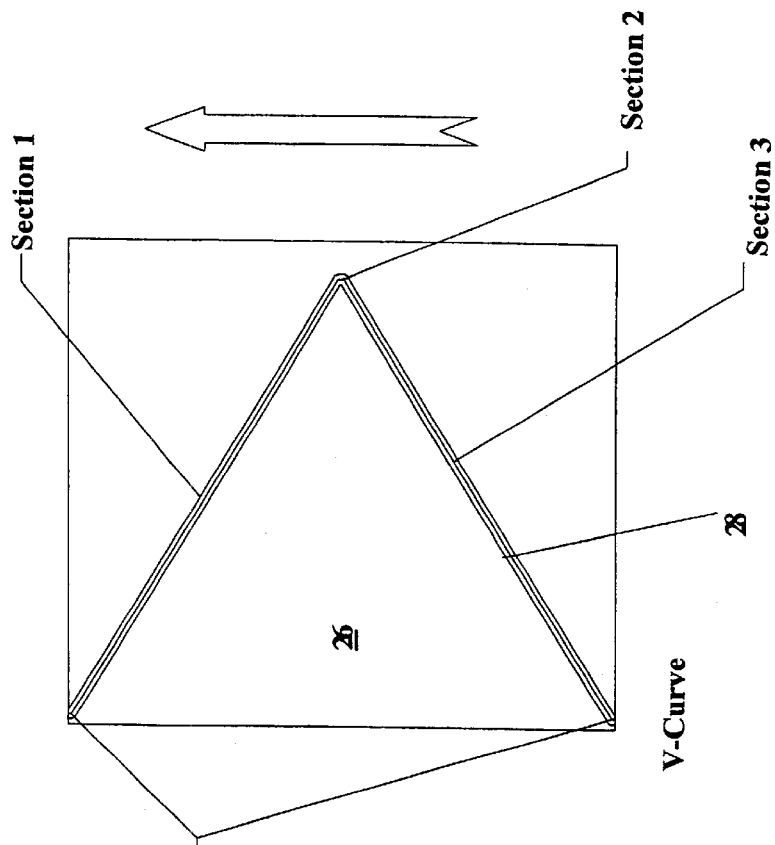
FIG. 4 is the developed view of the hollow cylinder of FIG. 3.
Figure 3:
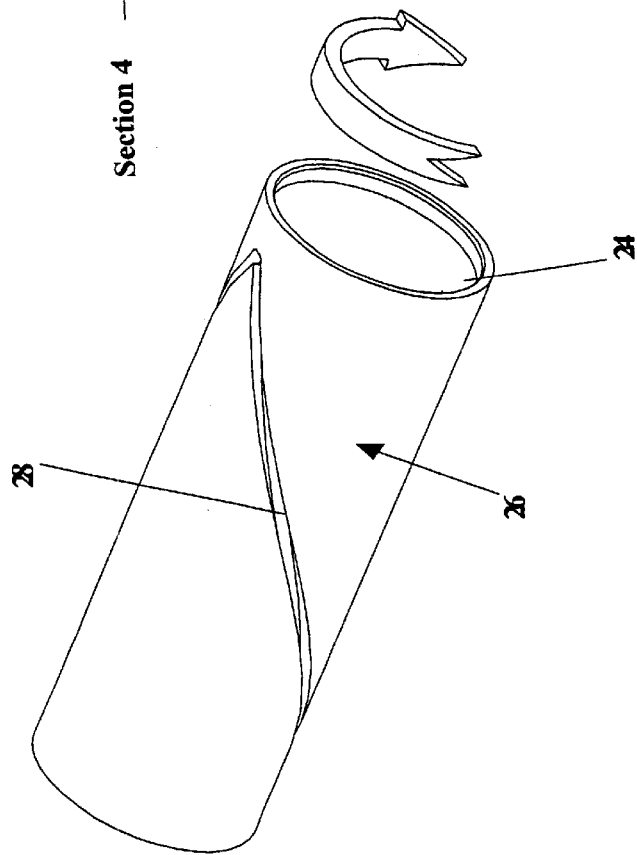
FIG. 3 is an axonometric representation of a hollow cylinder with a guide groove.

The kinematics of the cable drum 12 is shown by FIGS. 3 and 4 by way of four approximately linear curve sections, by which a complete drum movement is implemented. A complete drum movement is the path of the drum from a cable contact of its lateral disk 14 to the other lateral disk 16 and back. After this movement, the cable 10 is stacked in two layers. FIG. 3 shows the hollow cylinder 24 with the guide groove 28, and FIG. 4 shows the guide groove 28 developed on the plane.

The slope of the guide groove 28 in section 1 causes a continuous axial movement of the cable drum 12 by the rotation of the hollow cylinder 24 and by means of the guiding pin 30, which is guided in the guide groove 28, to section 2. As a result of the coincidence of the curve direction and the cylinder rotating direction, a short stop is generated there, by which a superimposition of the cable winding (start of the 2nd layer) is achieved. Section 3 results in the return of the cable drum 12, and section 4 results in an ascending of the cable into the 3rd position. The drum 12 is now again situated at its starting point.

Furthermore, in an oblong hole 32 (FIG. 2), which is situated in the housing of the carrier tube 4, the cable drum 12 experiences a torque support and thus its axial guidance. In addition, this oblong hole is used for the guiding of the driving pin 30.

In addition, when the driving motor 8 of the trailing cable winch 2 is not activated, the winch 2 is automatically locked by way of a locking brake 36 to achieve no-back securing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Trailing cable winch comprising:
   an axially stationary, rotating winding arm which is disposed on a carrier tube and driven by a motor arranged in the carrier tube which is capable of depositing a trailing cable on an axially reversibly movable cable drum which is disposed on the carrier tube;
   wherein the rotation of the winding arm is synchronized with a movement of the cable drum such that, during a linear movement of the cable drum, a linear advance of the cable drum per rotation of the winding arm corresponds substantially to a diameter of the trailing cable, and in an end position of the cable drum, two trailing cable layers are deposited above one another; and
   wherein in the carrier tube, a multistage planet wheel transmission is arranged which is driven by a motor shaft of the motor and includes a secondary stage which drives a hollow cylinder situated in the carrier tube, a cylinder jacket of the hollow cylinder having a guide groove into which a guiding pin, connected with the cable drum, engages and, when the hollow cylinder is rotated, causes an advancing of the cable drum, the guiding pin being guided in an axial oblong hole in the carrier tube.

2. Trailing cable winch according to claim 1, wherein the primary stage of the multistage planet wheel transmission is capable of causing a stepping down of the rotating winding arm, and the secondary stage of the planet wheel transmission is capable of causing a stepping down of the hollow cylinder having the guide groove.

3. Trailing cable winch according to claim 2, wherein the primary stage of the multistage planet wheel transmission is exchangeable for a primary stage having a different reduction.

4. Trailing cable winch according to claim 1, wherein the guide groove situated in the hollow cylinder is self-contained and shaped to form the legs of an isosceles triangle in a developed view of the hollow cylinder.

5. Trailing cable winch according to claim 1, wherein, when the motor is not activated, the trailing cable winch is automatically locked by way of a locking brake, for a no-back securing.

6. A trailing cable winch comprising:
   an axially stationary, rotating winding arm disposed on a carrier tube;
   a motor comprising a motor shaft arranged in the carrier tube and operatively arranged to drive the winding arm;
   a movable cable drum disposed on the carrier tube and operably arranged with the winding arm to be axially movable for depositing a trailing cable onto the cable drum;
   a multistage planet wheel transmission driven by the motor shaft arranged in the carrier tube, the multistage planet wheel transmission comprising a secondary stage operably arranged to drive a hollow cylinder situated in the carrier tube; and
   a cylinder jacket of the hollow cylinder comprising a guide groove into which a guiding pin of the cable drum is engaged such that when the hollow cylinder is rotated, the cable drum is axially moved by the guiding pin being guided through an axial oblong hole in the carrier tube;
   wherein a rotation of the winding arm is synchronized with the axial movement of the cable drum such that the cable drum advances an axial distance per rotation of the winding arm which corresponds substantially to a diameter of the trailing cable such that two cable layers are deposited above one another between end positions of the cable drum.

7. Trailing cable winch according to claim 6, wherein a primary stage of the multistage planet wheel transmission is operably arranged to cause a stepping down of the rotating winding arm, and the secondary stage of the planet wheel transmission is operably arranged to cause a stepping down of the hollow cylinder comprising the guide groove.

8. Trailing cable winch according to claim 7, wherein the primary stage of the multistage planet wheel transmission is exchangeable for a primary stage having a different reduction.

9. Trailing cable winch according to claim 6 wherein the guide groove situated in the hollow cylinder is self-contained and shaped to form the legs of an isosceles triangle in a developed view of the hollow cylinder.

10. Trailing cable winch according to claim 6, wherein when the motor is not activated, the trailing cable winch is automatically locked by way of a locking brake, for a no-back securing.

11. A method of depositing a trailing cable on a trailing cable winch, the trailing cable winch comprising an axially stationary, rotating winding arm disposed on a carrier tube, a motor comprising a motor shaft arranged in the carrier tube and operatively arranged to drive the winding arm, and a movable cable drum disposed on the carrier tube and operably arranged with the winding arm to be axially movable, the method comprising the acts of:

synchronizing the rotation of the winding arm with the axial movement of the cable drum by way of a rotating hollow cylinder located inside the carrier tube including a guide groove on a cylinder jacket thereof into which a guiding pin, connected to the cable drum and guided in an oblong hole in the carrier tube, engages such that the cable drum advances an axial distance per rotation of the winding arm which corresponds substantially to a diameter of the trailing cable; and depositing two layers of the trailing cable between end positions of the cable drum.

* * * * *